Oct. 16, 1951  J. W. ARNOLD  2,571,098
LUBRICATOR WITH ADJUSTABLE OIL FEEDER FOR PNEUMATIC TOOLS
Filed March 8, 1948
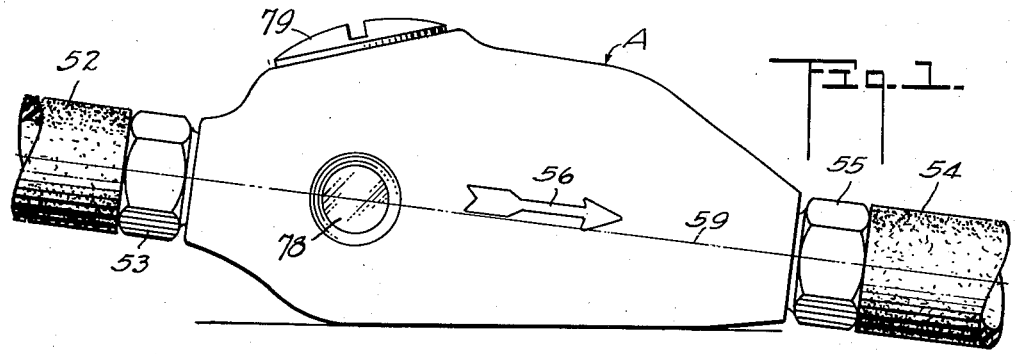
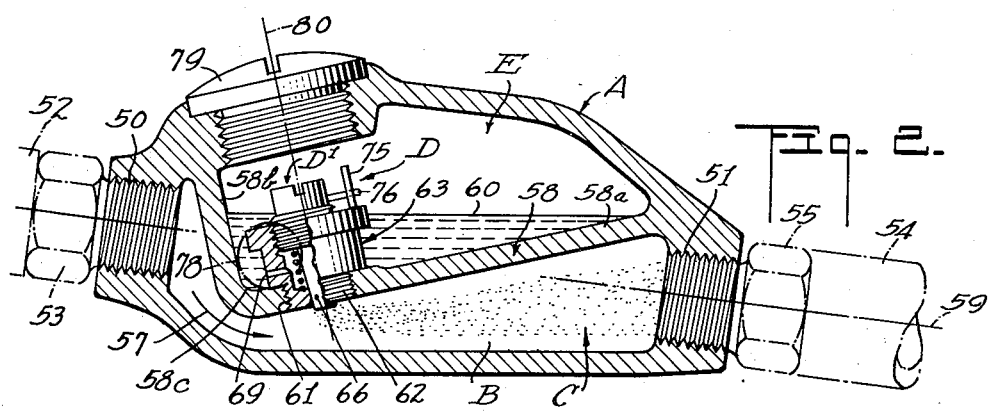
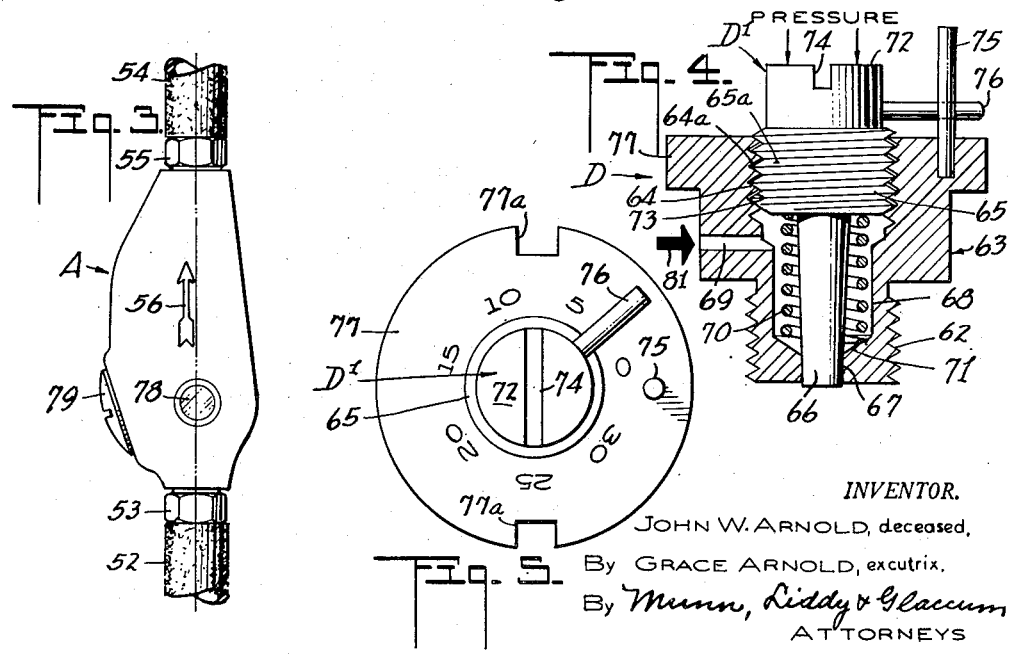
INVENTOR.
JOHN W. ARNOLD, deceased,
By GRACE ARNOLD, excutrix.
By Munn, Liddy & Glaccum
ATTORNEYS Patented Oct. 16, 1951

2,571,098

UNITED STATES PATENT OFFICE 2,571,098

LUBRICATOR WITH ADJUSTABLE OIL FEEDER FOR PNEUMATIC TOOLS

John W. Arnold, deceased, late of San Francisco, Calif., by Grace Arnold, executrix, San Francisco, Calif., assignor, by decree of distribution, to Grace Arnold Application March 8, 1948, Serial No. 13,694

1 Claim. (Cl. 184—55)

The present invention relates to improvements in a lubricator with adjustable oil feeder for pneumatic tools. It has particular reference to a lubricator that may be installed in a compressed air line leading to a pneumatic tool so as to supply a fog of oil to the latter whenever air is flowing to the tool. The fog of oil increases the life of the tool and keeps it in sustained operation. Once in the oil line with pressure turned on, the pressure backs up into a feeder, and by means of a breather into an oil reservoir. When the operator starts the tool, the pressure in the air line momentarily drops. Back pressure in the reservoir forces a fog of oil into the air line.

This fog of oil provides perfect lubrication and yet does away with the old problem of hose deterioration, as the oil is in the air itself—not clinging to the hose wall. The flow of the fog of oil is automatic while the tool is in use.

This invention embodies improvements over the Adjustable Feed for Pneumatic Tool Lubricators shown in United States Patent No. 2,046,313, granted to John W. Arnold on July 7, 1936. Further it provides for improvements in the Oil Feeder for Lubricator illustrated in John W. Arnold's copending application, Serial No. 556,239, filed on September 28, 1944, now abandoned.

An object of the present invention is to provide a lubricator of the character described, which will operate in an air line, regardless of the inclination of the lubricator into horizontal and vertical positions.

Another object of the invention is directed to the automatic closing of the oil feeder when the pressure in the air line is cut off, resulting in precluding a glob of oil from dropping into the air passageway of the lubricator. Such a glob of oil would be forced to the tool and sprayed out through the exhaust port of the tool when the air is turned on again.

A still further object of the invention resides in the provision of a pressure-proof window, which will allow the operator to determine at a glance that a supply of oil still remains in the lubricator. When the level of the oil is viewable through the window, the lubricator requires another supply of oil.

Other objects and advantages will appear as the specification continues, and the novel features will be set forth in the claim hereunto appended.

For a better understanding of the invention, reference should be made to the accompanying drawing, forming part of this application, in which:

Figure 1 is a side elevation of a lubricator constructed in accordance with the invention, the lubricator being disposed in a substantially horizontal position;

Figure 2 is a longitudinal sectional view taken through the same lubricator;

Figure 3 is a view similar to Figure 1, but disclosing the lubricator on a smaller scale and arranged in vertical position;

Figure 4 is a vertical sectional view taken through the oil feeder and breather, parts being illustrated in elevation with the valve in closed position, and Figure 5 is a top plan view of Figure 4.

While only the preferred form of the invention has been shown, it will be understood that various changes, or modifications, may be made within the scope of the annexed claims without departing from the spirit thereof.

In carrying the invention into practice, the inventor provided an oil lubricator housing indicated generally at A, which has an air passageway B leading therethrough. This passageway extends lengthwise of the housing and communicates with inlet and outlet ports 50 and 51, respectively, disposed at opposite ends of the passageway. An air inlet hose 52 leads from a source of compressed air and is coupled to the port 50 by a fitting 53. The port 51 has an outlet hose 54 coupled thereto by a fitting 55, and this hose extends to a pneumatic tool (not shown).

During the operation of the pneumatic tool, air under pressure flows through the passageway B in the direction of the indicating arrow 56 provided on the exterior of the housing. This flow of compressed air is further suggested by the arrow 57 in Figure 2. As the air flows through the passageway B, a fog of oil, which is designated at C in Figure 2, is entrained into the air stream and is conveyed through the outlet hose to the pneumatic tool. A combined oil feeder and breather D operates to deliver the fog of oil to the passageway in a manner hereinafter described.

Referring now to the details of the housing A, it will be seen from Figure 2 that an oil reservoir E is provided on the interior of the housing and is separated from the air passageway B by an internal partition designated generally at 58. This reservoir is disposed above the passageway B when the housing occupies a substantially horizontal position, as in Figures 1 and 2. When the housing is moved into a substantially vertical position, as in Figure 3, the reservoir will be located on one side of the air passageway.

The housing A is light in weight and adds no appreciable drag to the air hoses, and its streamlined shape pulls around corners without catching. As the hose 54, which leads to the pneumatic tool (not shown) is pulled toward a vertical position, the housing will follow readily. In coupling the housing into the air line, care must be taken to insure that the compressed air will flow through the passageway B in the direction of the arrow 56.

The partition 58 extends from one side of the housing A to the opposite side thereof. It includes a bottom wall 58a that slopes relative to the axis 59 of ports 50 and 51. The direction of slope is rearwardly and downwardly from a position above the outlet port 51 to a point adjacent to the inlet port 50. At this point, the partition defines a rear wall 58b that extends upwardly at right angles to the bottom wall 58a. The lowest part of the reservoir E is disposed at the junction 58c of the walls 58a and 58b. This arrangement causes oil 60 in the reservoir to gravitate toward the rear wall 58b, regardless of whether the housing is horizontally disposed, as shown in Figure 1, or vertically disposed, as shown in Figure 3, or at any angle of inclination therebetween.

The bottom wall 58a has a threaded opening 61 fashioned therein for receiving a threaded shank 62 formed as part of the combined oil feeder and breather D. This shank is integral with a valve body indicated generally at 63. The upper portion of this valve body has a threaded bore 64 that is adapted to receive a threaded plug 65 of an adjustable valve D1. The latter has a tapered stem 66 formed integral with and depending from the plug 65. This stem projects into a tapered oil outlet 67 fashioned in the lower part of the shank 62. The taper of the stem 66 and outlet 67 preferably correspond with one another, as clearly illustrated in Figure 4.

The interior of the valve body 63 is fashioned with a cavity 68, which extends from the threaded bore 64 to the outlet 67. A lateral bore 69 in the valve body places the cavity 68 in communication with the oil reservoir E at a point adjacent to the junction 58c, or the lowest part of the reservoir. The bore 69 faces toward the rear wall 58b of the internal partition.

The cavity 68 houses a coil spring 70, which encircles the stem 66. The top of this spring bears against the undersurface of the plug 65, while the bottom of the spring rests on a seat 71 provided at the bottom of the cavity 68. It will be noted from Figure 4 that the threads on this plug fit loosely with the threads in the bore 64. Assuming that no pressure prevails in the reservoir E, the plug 65 will be forced upwardly by the spring 70 until the upper surfaces 65a of the plug bear against the underneath surfaces 64a of the threads provided in the bore 64. In Figure 4, however, the word "Pressure" indicates that downward pressure exists against the head 72 of the adjustable valve D1. This has caused a space 73 to be created between the surfaces 64a and 65a of the threads. The reason for this space will be set forth later. The spring causes the plug 65 to remain in the position to which it is adjusted.

The adjustable valve D1 has a kerf 74 therein by means of which the valve can be adjusted to vary the amount of spacing between the tapered stem 66 and the oil outlet 67. The valve body 63 carries an upright pin 75 that acts as a stop for a radially-extending pin 76, the latter being fixed to and projecting from the head 72.

Referring now to Figures 4 and 5, it will be noted that the valve body 63 is provided with a flange 77. The upper surface of this flange is graduated with the numerals 0 to 30, inclusive, in multiples of five. The stem 66 may be completely closed upon the wall of the opening 67 for shutting off the oil supply from the cavity 68 to the passageway, and this occurs when the head 72 is turned in a clockwise direction in Figure 5 until the pin 76 strikes the pin 75. It will be understood, of course, that when the head is turned counter-clockwise in this same view, the stem 66 will be retracted relative to the wall of the outlet opening 67. This will allow a greater amount of oil fog to enter the passageway B.

The housing A is provided with a pressure-proof window 78 in one wall thereof. This window is arranged adjacent to the junction 58c (see Figure 2); which, also, is adjacent to the inlet end of the lateral bore 69. Whenever the oil 60 in the reservoir E covers the window 78, regardless of the inclination of the housing A, the operator will know that there is sufficient oil in the reservoir for lubricating the pneumatic tool. However, when the actual level of the oil can be observed through the window, the oil supply should be replenished.

Access to the reservoir E for filling purpose is had by removing a plug 79. The axis 80 of this plug extends at right angles to the sloping wall 58a and also coincides with the longitudinal axis of the adjustable valve D1. When the plug 79 is removed, the threaded shank 62 can be threaded into the opening 61. The flange 77 is provided with recesses 77a to permit this shank to be screwed into place or removed. Adjustment of the valve D1 is afforded when the plug 79 is removed.

Having thus described the various parts of the device, the operation thereof may be summarized briefly as follows:

When the lubricator is used in a compressed air line leading to a pneumatic tool, the intermittent use of the latter causes the air pressure in the passageway to vary. Once the air pressure has built up, some of the air will cause the tapered stem 66 to raise relative to the wall of the opening 67, and this air will bleed through the cavity 68 and bore 69 into the reservoir E. This is assuming that the valve D1 is at least partially opened.

As soon as the operator starts the pneumatic tool, the pressure in the passageway B momentarily drops. Back pressure of air in the reservoir forces a fog of oil, as suggested by the arrow 81 in Figure 4, from the reservoir into the passageway B. The actual amount of the fog of oil C entering the passageway depends upon the setting of the adjustable valve D1.

This fog of oil is suspended in the air stream and will provide perfect lubrication for the tool. At the same time the problem of hose deterioration is not present, since the oil is in the air itself—not clinging to the hose walls. The flow of the fog of oil is automatic while the tool is in use, regardless of the inclination of the housing A. The operator can determine at a glance at the window 78 whether or not a sufficient supply of oil remains in the reservoir E.

The loose fitting of the threads on the screw plug 65 with those in the threaded bore 64 will permit automatic shutting off of the oil supply to the passageway for fine settings of the adjustable valve D1, for instance 5/1000 of an inch. This will be obvious by reference to Figure 4, wherein pressure in the reservoir is tending to push the head 72 downwardly. Assuming that the pressure in the passageway B drops, the space 73 between the thread surfaces 64a and 65a will permit the stem 66 to move downwardly against the action of the spring 70 until the outlet opening 67 is closed. This will prevent a glob of oil from entering the passageway B during a period of non-use of the pneumatic tool. Such a glob of oil would be forced through the hose 54 and finally be discharged through the exhaust port of the tool, splattering the operator and work.

The adjustable oil feeder makes it adaptable to all climates and conditions. This permits a perfect flow of oiled fog to be obtained from kerosene, solvent, or various grades and weights of oil. An increased opening may be found necessary for lower temperatures. The valve D1 should be adjusted to a point where a slight film of oil can be felt on the operator's hand when it is held over the exhaust of the pneumatic tool.

What is claimed is:

A lubricator for pneumatic tools which is adapted to be connected into the air hose line comprising an elongated housing including a lower wall, said housing having a dividing wall therein which provides an upper chamber forming a lubricant-retaining reservoir and a lower chamber forming an air passageway, said passageway extending longitudinally of the housing, said housing having an inlet port at one end thereof communicating with one end of the passageway and having an outlet port at the other end thereof communicating with the other end of the passageway; said dividing wall having one portion thereof extending from one end of the housing adjacent said outlet port downwardly towards the opposite end of said housing to a point adjacent the lower portion of the inlet port and having a second portion extending from said point adjacent the inlet port upwardly to a position adjacent the upper portion of said inlet port, and a lubricant feeder and breather arranged adjacent the lowermost portion of said dividing wall for feeding substantially all of the lubricant from the reservoir into the air passageway when the housing is horizontally disposed or vertically disposed with the inlet port down.

GRACE ARNOLD,
*Executrix of the Estate of John W. Arnold, Deceased.*

REFERENCES CITED

The following references are of record in the file of this patent:

UNITED STATES PATENTS

| Number | Name | Date |
| --- | --- | --- |
| 1,696,485 | Ihrmark | Dec. 25, 1928 |
| 1,887,393 | Badgett | Nov. 8, 1932 |
| 2,046,313 | Arnold | July 7, 1936 |
| 2,299,665 | Turner | Oct. 20, 1942 |
| 2,459,398 | Walters | Jan. 18, 1949 |